United States Patent [19]
Kuhn

[11] 3,984,843
[45] Oct. 5, 1976

[54] RECORDING APPARATUS HAVING A SEMICONDUCTOR CHARGE ELECTRODE

[75] Inventor: Lawrence Kuhn, Ossining, N.Y.

[73] Assignee: International Business Machines Corporation, Armonk, N.Y.

[22] Filed: Aug. 26, 1975

[21] Appl. No.: 607,971

Related U.S. Application Data

[63] Continuation-in-part of Ser. No. 484,825, July 1, 1974, abandoned.

[52] U.S. Cl. .................................. 346/75; 29/25.1; 317/3
[51] Int. Cl.² ....................................... G01D 15/18
[58] Field of Search ............ 346/75; 317/3; 29/25.1

[56] References Cited
UNITED STATES PATENTS

| | | | |
|---|---|---|---|
| 3,701,998 | 10/1972 | Mathis | 346/75 |
| 3,786,517 | 1/1974 | Krause | 346/75 |
| 3,949,410 | 4/1976 | Bassoos | 346/75 |

*Primary Examiner*—Joseph W. Hartary
*Attorney, Agent, or Firm*—Jack M. Arnold

[57] ABSTRACT

A charging electrode array for droplets formed from a plurality of liquid streams is formed in a silicon substrate. The substrate also has an FET shift register and FET latch circuits formed therein to supply signals to the charging electrodes, which are formed by diffusing a dopant into at least a selected portion of the wall of each of a plurality of passages in the substrate.

26 Claims, 9 Drawing Figures

RECORDING APPARATUS HAVING A SEMICONDUCTOR CHARGE ELECTRODE

CROSS-REFERENCE TO RELATED APPLICATION

This application is a continuation-in-part of application Ser. No. 484,825, filed July 1, 1974, now abandoned, entitled, "Recording Apparatus Having a Semiconductor Control Head", which is assigned to the same assignee as the present invention.

BACKGROUND OF THE INVENTION

In recording apparatuses of the type shown in U.S. Pat. Nos. 3,373,437 to Sweet et al and 3,618,858 to Culp, a plurality of liquid streams is supplied under pressure. Each of the streams passes through a separate charging electrode where each of the droplets, which is formed from the stream within the charging electrode, is either charged or not charged so as to determine whether the droplet will strike a recording medium such as paper, for example.

To control each of the charging electrodes, it is necessary to use a separate wire from a source of power to each of the electrodes. Thus, with fifty to one hundred charging electrodes in a charging electrode array, for example, the number of wires become excessive.

Additionally, because of the relatively small size of the passage through which the liquid stream and the droplets formed therefrom are passing, it has been difficult to plate the surface of the passage, for example. This plating is necessary to produce the charging electrode.

The present invention satisfactorily solves the foregoing problems by providing a control head in which the number of wires required to the power source is reduced by one or two orders of magnitude. Furthermore, the present invention also overcomes the difficulty of forming the charging electrode.

The present invention accomplishes the foregoing through utilizing a semiconductor substrate and forming each of the charging electrodes by a diffusion into at least a selected portion of each passage in an array of passages in the substrate. Additionally, each of these diffusions is connected through a latch circuit, which can be formed in the front surface of the substrate, to a shift register, which also can be formed in the front surface of the substrate. The connection from each of the diffusions, which form the charging electrodes, to the latch circuit is by a diffused region.

Accordingly, the present invention requires only two wires to the shift register to supply the information to all of the charging electrodes with one wire supplying the data and the other wire supplying pulses to shift the data, a single wire to the latch circuits to activate them to allow the signals in the shift register to be supplied to the diffused regions, and a single wire supplying power to both the latch circuits and the shift register. Thus, the shift register allows power to be supplied through the latch circuit to each of the charging electrodes or prevents it in accordance with the data signal at the shift register for the particular charging electrode.

An object of this invention is to provide a unique control head for controlling the charging of liquid droplets to be used in a recording apparatus.

Another object of this invention is to provide a recording apparatus having charging electrodes for charging the droplets and the control circuits for the charging electrodes in a single element.

The foregoing and other objects, features, and advantages of the invention will be apparent from the following more particular description of preferred embodiments of the invention as illustrated in the accompanying drawings.

SUMMARY OF THE INVENTION

According to the present invention, an integrated ink jet printing head which includes a charge electrode structure has been disclosed. The charge electrode structure comprises a semiconductor substrate having at least one passage extending therethrough. A diffused region is formed in the substrate in at least a selected portion of the one passage, with the diffused region being of the opposite type of conductivity to the type of conductivity of the substrate. Control circuits may also be formed on the substrate for controlling the energization of the charge electrode.

DETAILED DESCRIPTION OF THE INVENTION

Figure 1:
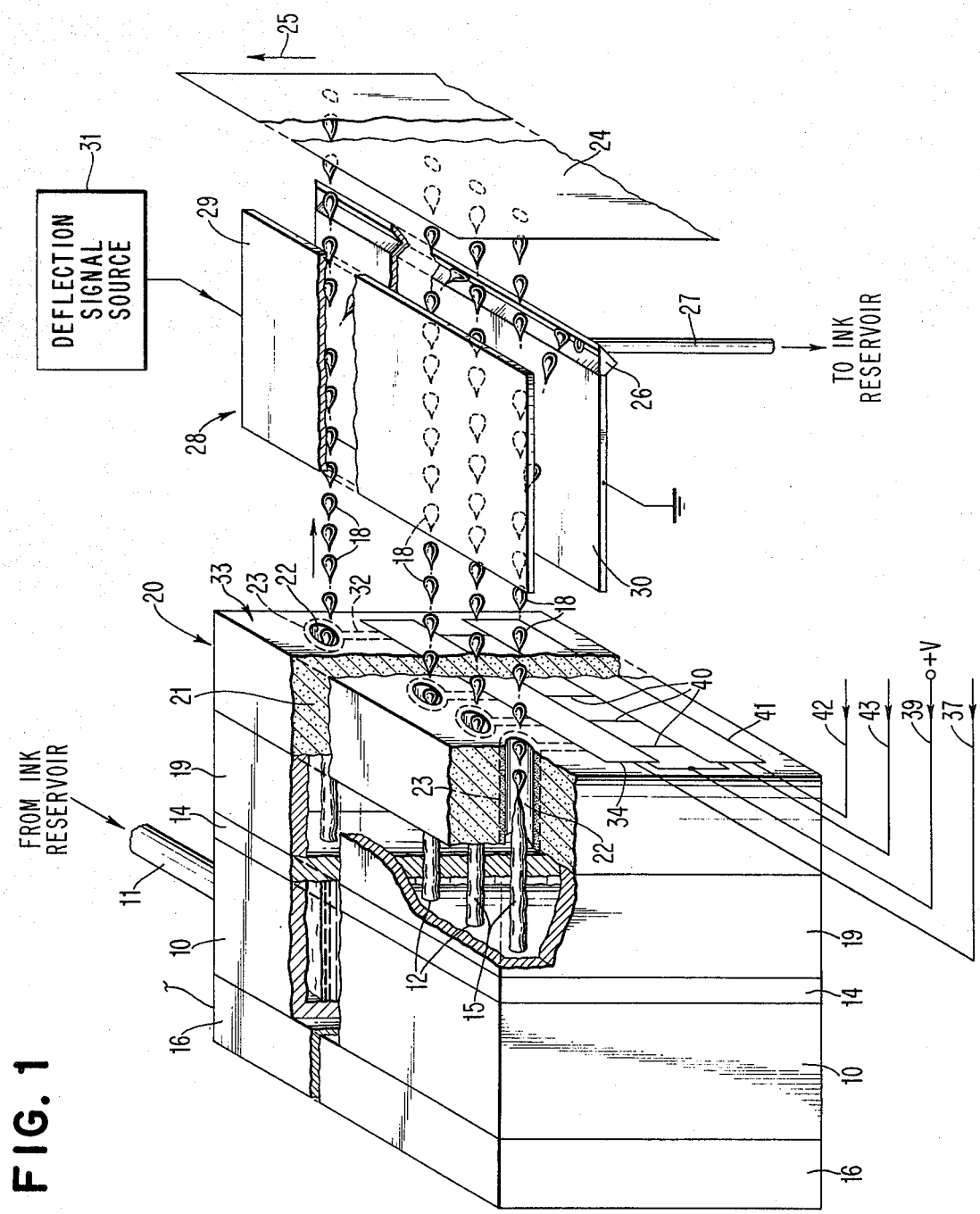
FIG. 1 is a schematic perspective view of a recording apparatus in which the control head of the present invention is employed for selectively charging droplets formed from each of a plurality of liquid streams.

Referring to the drawings and particularly FIG. 1, there is shown an ink manifold 10 to which ink from a reservoir (not shown) is supplied through a supply tube 11. The ink is an electrically conductive material. The manifold 10 has the ink supplied under pressure so that the ink flows from nozzles 12 in a nozzle plate 14 as a plurality of liquid streams 15.

The manifold 10 is subjected to vibrations from suitable vibrating means 16 such as a piezoelectric transducer, for example. The vibrations created by the vibrating means 16 causes each of the streams 15 to be broken up into a plurality of substantially uniformly spaced droplets 18.

A spacer 19 disposes a charging head 20, which includes a substrate 21 formed of a suitable semiconductor material such as silicon, for example, in spaced relation to the nozzle plate 14 so that each of a plurality of passages 22 formed therein has the droplets 18 from the stream 15 break up within the passage 22. The substrate 21 has a diffused region 23 formed in a selected portion therein in surrounding relation to each of the passages 22 with the diffused region 23 having the opposite type of conductivity to the substrate 21.

Therefore, when a voltage is supplied to the diffused region 23, which functions as a charging electrode, the droplet 18, which is breaking off from the stream 15 but still connected thereto and is disposed within the passage 22, is charged. Charging of the droplet 18 by the diffused region 23 being activated results in the droplet 18 not being utilized to print on a recording medium such as a paper 24, which is moving in the vertical direction indicated by an arrow 25.

If the droplet 18 is charged by the diffused region 23, the droplet 18 will deflect into a gutter 26, which has a tube 27 returning the ink droplets 18 from the gutter 26 to the reservoir to which the manifold 10 is connected through the supply tube 11. The charged droplet 18 is deflected into the gutter 26 be a deflector 28.

The deflector 28 includes a pair of parallel electrodes 29 and 30 with a deflection signal source 31 supplying a voltage to the electrode 29 and the electrode 30 being grounded and having the gutter 26 connected thereto. Accordingly, all of the charged droplets 18 are deflected by the deflector 28 towards the gutter 26. Thus, the print pattern on the paper 24 is determined by the droplets 18, which have not been charged within the passages 22.

Each of the diffused regions 23 is connected to a diffused region 32 in front surface 33 of the substrate 21. Each of the diffused regions 32, which are formed of the same conductivity as the diffused regions 23, is connected to one of a plurality of latch circuits 34, which also are formed in the front surface 33 of the substrate 21. Each of the latch circuits 34 preferably is formed by a plurality of FETs.

Figure 4:
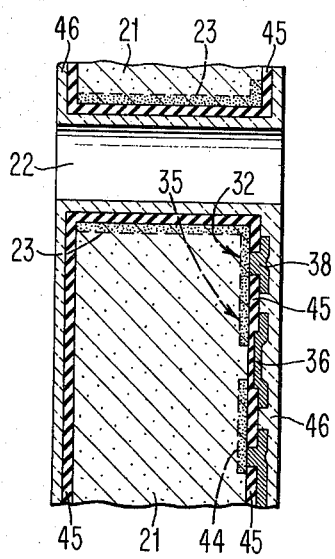
FIG. 4 is a fragmentary sectional view of the control head of FIG. 2 showing the relation between one of the FETs of a latch circuit and one of the charging electrodes and taken along line 4—4 of FIG. 2.

As shown in FIG. 4, the end of the diffused region 32 remote from the diffused region 23 functions as a drain region 35 of one of the FETs of the latch circuit 34 for the diffused region 23. Thus, the diffused region 32 connects the diffused region 23, which surrounds the passage 22, to one of the FETs forming the latch circuit 34 for the diffused region 23.

The FET, which includes the drain region 35, has the potential on its gate electrode 36 dependent on the state of the latch circuit 34. Thus, the state of the latch circuit 34 determines whether the FET having the gate electrode 36 is rendered conductive or not.

If the diffused region 23 connected to the latch circuit 34 is not to allow charging of the droplet 18 within the diffused region 23 and still connected to the stream 15, then the state of the latch circuit 34 renders the FET having the gate electrode 36 conductive. If the diffused region 23 is to cause charging of the droplet 18 therein and still connected to the stream 15, then the state of the latch circuit 34 results in the FET not being conductive.

Figure 2:
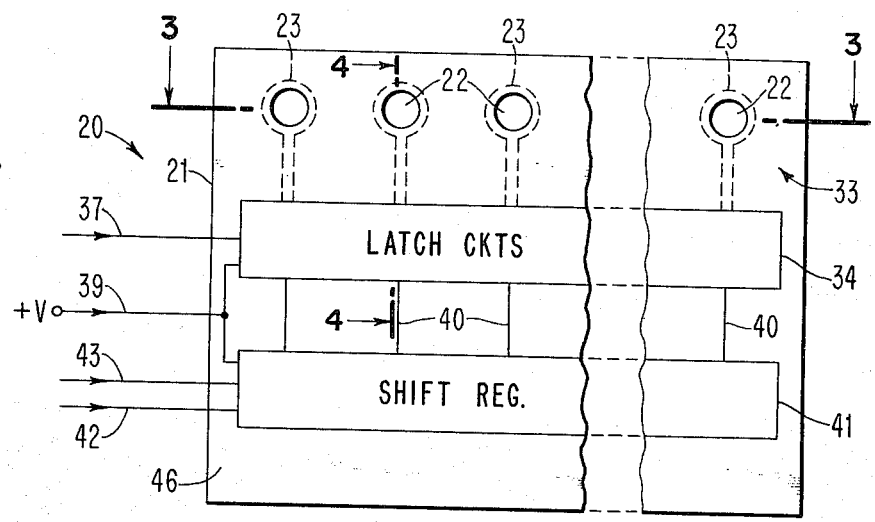
FIG. 2 is a front elevational view, partly schematic, of the control head of the present invention.

The diffused region 32 is connected by a line 38 (see FIG. 4) to a load device (not shown), which can be another FET, of the latch circuit 34. A DC voltage supply line 39 (see FIG. 2) is connected to the load device of the latch circuit 34.

Thus, whenever the state of the latch circuit 34 is to allow charging of the droplet 18 within the diffused region 23 and still connected to the stream 15, substantially no current flows through the load device of the latch circuit 34 since the FET having the drain region 35 is not rendered conductive. This results in the potential of the diffused region 23 being sufficient to cause the droplet 18 within the diffused region 23 and connected to the stream 15 to be charged.

Whenever the latch circuit 34 is in the state in which the diffused region 23 is to prevent charging of the droplet 18, current flows through the line 38 (see FIG. 4) and through the FET having the drain region 35 to ground since the FET is conductive. This causes the diffused region 23 to be at substantially ground potential whereby there is no charging of the droplet 18 within the diffused region 23 and connected to the stream 15.

The state of the latch circuit 34 for the diffused region 23 depends upon a signal supplied thereto over a line 40 (see FIGS. 1 and 2) from signal storage means, which is preferably a shift register 41, whenever a clock pulse is supplied over a line 37 to each of the latch circuits 34. The shift register 41 is preferably an FET shift register with each stage of the shift register 41 having a plurality of the FETs. The shift register 41 preferably has the FETs formed in the front surface 33 of the substrate 21. The shift register 41 has the DC voltage supply line 39 connected to a load device, which can be an FET, associated with each stage of the shift register 41.

The data input to the shift register 41 is supplied by a line 42 to the first stage of the shift register 41. The data is shifted from one of the stages of the shift register 41 to the next stage of the shift register 41 by supplying clock pulses over a line 43 to an electrode, preferably the gate electrode, of one of the FETs forming each stage of the shift register 41 until all of the stages of the shift register 41 have the necessary data.

The data input to the shift register 41 is supplied over the line 42 after the information stored in the shift register 41 has been transmitted to the latch circuits 34 to control selective charging of the droplets 18 within the passages 22 in the substrate 21 at the particular time. If the droplet 18 is to be charged, the signal from the shift register 41 to the latch circuit 34 results in the voltage being supplied from the voltage supply line 39 through the line 38 (see FIG. 4) and the diffused region 32 to the diffused region 23.

The clock pulses on the line 37 (see FIGS. 1 and 2) are controlled in accordance with the vibration frequency of the vibrating means 16 so that the diffused region 23 initially receives the voltage, if it is to be supplied, for charging the droplet 18 at the time that the droplet 18 is about to break off from the stream 15 but before the droplet 18 breaks off from the stream 15. The state of each of the latch circuits 34 remains until the next time that a signal is supplied from the shift register 41 to the latch circuit 34 so that the diffused region 23 has the voltage thereon until the next time that a clock pulse is supplied over the line 37 to cause the latch circuits 34 to receive the inputs from the shift registers 41 whereby each of the latch circuits 34 remains in the same state or shifts state.

After the shift register 41 has transmitted the signals, which are in the shift register 41, to each of the latch circuits 34 for controlling the supply of voltage to the connected diffused region 23, new data is supplied to the shift register 41. Thus, the shift register 41 is ready to transmit the new data to the latch circuits 34 when another clock pulse is supplied over the line 37 to simultaneously activate all of the latch circuits 34 to receive the data from the shift register 41.

Accordingly, only four lines are required to the control head 20. These are the power line 39, the line 37 for the latch circuits 34, and the lines 42 and 43 for the shift register 41. In the previously available devices, each of the charging electrodes which are defined by the diffused regions 23 in the present invention, had a separate wire connected thereto for connection to a power source.

In forming the control head 20 of the present invention, the substrate 21 is formed of a high resistivity P or N material. The substrate 21 then has the passages 22 formed therein by etching or drilling with an electron beam or a laser beam, for example, to form the relatively small diameters of the passages 22 such as .005 inch, for example.

Thermal oxide is then grown over all the surfaces of the substrate 21 including the walls of the passages 22. Then, the thermal oxide is removed from the walls of the passages 22 and portions of the front surface 33 by any suitable means such as etching, for example.

Then, a dopant of the opposite conductivity to the conductivity of the substrate 21 is diffused in any well-known manner to form the diffused regions 23, which surround the passages 22, and the diffused regions 32. The dopant also forms a diffused source region 44 (see FIG. 4) for the FET having the drain region 35 formed by the end of the diffused region 32 of each of the latch circuits 34.

Furthermore, it should be understood that all of the other FETs of the latch circuits 34 could have their drain and source regions formed at the same time and all of the FETs of the shift register 41 could have their drain and source regions formed at the same time. Of course, it may be desired to form the source and drain regions for the various FETs at different times so as to obtain different depths of the diffusions, for example. This would necessitate additional thermal oxide growth over the prior diffusions and then diffusing again in any well-known manner.

Figure 3:
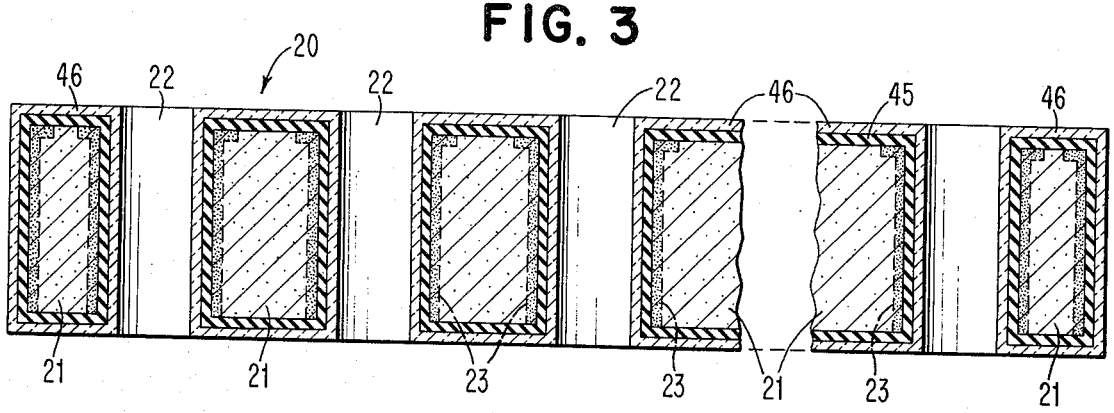
FIG. 3 is a sectional view of the control head of FIG. 2 taken along line 3—3 of FIG. 2.

After all the diffusions have been completed, whether one or a plurality of diffusions, the entire substrate 21 has a layer 45 (see FIG. 3) of thermal oxide grown thereon. Then, holes are etched in the thermal oxide. Next, a layer of metal is deposited over the layer 45 of oxide on the front surface 33 of the substrate 21. After deposition of the layer of metal, portions of the layer of metal are etched to form the electrodes of each of the FETs forming the latch circuits 34, the electrodes of each of the FETs forming the shift register 41, the lines 40 connecting the shift register 41 with the latch circuits 34, and the portions of the input lines 37, 39, 42, and 43 on the substrate 21.

Finally, the control head 20 is passivated through having a layer 46 of silicon dioxide, for example, deposited thereon. The passivation of the control head 20 prevents corrosion.

Considering the operation of the present invention, the control head 20 is disposed adjacent the nozzle plate 14 (see FIG. 1) so that the droplet 18 breaking off from the stream 15 is disposed within the passage 22. If the diffused region 23 has a voltage supplied thereto from the line 39 through the latch circuit 34, the droplet 18 connected to the stream 15 and about to break off is charged. As a result, the droplet 18 is deflected to the gutter 26 by the deflector 28 when the droplet 18 passes through the deflector 28.

However, if the diffused region 23 does not receive a voltage from the line 39 through the latch circuit 34 when a clock pulse is supplied on the line 37, then the droplet 18 is not charged. As a result, the droplet 18 strikes the paper 24 to form part of the print pattern thereon.

Instead of forming each of the passages 22 to completely surround the stream 15 with which it cooperates, the substrate 21 could be formed with U-shaped passages 47 (see FIG. 5) by sawing or etching of slots, for example. A diffused region 48 would surround each of the U-shaped passages 47 and function as the charging electrode in the same manner as the diffused region 23. The diffused region 48 would be connected to the diffused region 32 in the same manner as the diffused region 23 is connected thereto for connection of each of the diffused regions 48 to one of the FETs of each of the latch circuits 34.

While the lines 40 have been described as being formed of metal, it should be understood that the lines 40 could be formed by diffused regions. Thus, a diffused region, which functions as the source region for one of the FETs of each of the latch circuits 34, could extend within the substrate 21 so as to also function as the drain region of the connected FET forming part of one of the stages of the shift register 41. As a result, the metallic source electrode of one of the FETs of each of the latch circuits 34 and the metallic drain electrode of one of the FETs of each of the stages of the shift register 41 could be eliminated.

While each of the latch circuits 34 has been discribed as comprising a plurality of FETs, it should be understood that each of the latch circuits 34 could be formed of any other suitable semiconductor devices. While each of the stages of the shift register 41 has been described as being formed by a plurality of FETs, it should be understood that each of the stages of the shift register 41 could be formed of any other suitable semiconductor devices. It is only desired that the latch circuits 34 and the shift register 41 be capable of being formed in the front surface 33 of the substrate 21.

While the substrate 21 is preferably formed of silicon, it should be understood that the substrate 21 could be formed of any suitable high resistivity semiconductor material. Thus, the substrate 21 could be formed of germanium or gallium arsenide, for example.

Figure 6A:
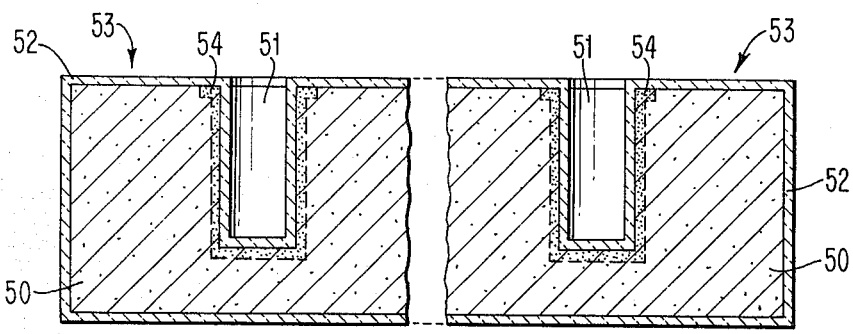
FIGS. 6A and 6B represent sequential cross-sectional views of a charge electrode structure formed in accordance with the present invention.
Figure 6B:
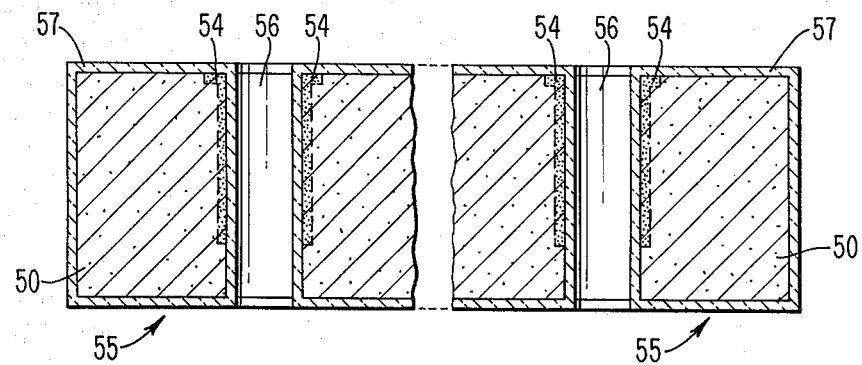

Refer now to FIGS. 6A and 6B which illustrate another method for forming a charge electrode structure in accordance with the present invention. A semiconductor substrate, for example silicon, has at least one passage extending therethrough, with a charge electrode being formed in at least a selected portion of the passage. Accordingly, a single or an array of charge electrodes may be formed in accordance with the present invention. A substrate 50 (see FIG. 6A) which is formed by a high resistivity P or N material has holes 51 formed therein, and which extend only partially through the substrate. The holes are of a relatively small diameter, for example, .005 inch. The holes are formed by etching, or drilling with an electron beam or a laser beam for a predetermined amount of time.

Thermal oxide 52 is then grown over all of the surfaces of the substrate 50 including the walls of the holes 51. Then, the thermal oxide is removed from the walls of the holes 51 and portions of the front surface 53 by any suitable means such as etching for example.

Then, a dopant of the opposite conductivity to the conductivity of the substrate 50 is diffused in any well-known manner to form diffused regions 54, which surround the holes 51.

Using a similar etching or drilling process a hole is formed extending from the back surface 55 (see FIG. 6B) to the hole 51 to form a passage 56 which extends completely through the substrate 50. The structure is subsequently coated with a passivating layer 57 such as SiO$_2$. The result is a semiconductor charge electrode structure in which at least one passage extends therethrough, with a charge electrode 54 being formed by diffusion in at least a selected portion of the passage. For the structure shown, the selected portion of the passage extends a selected amount from the end thereof. It is to be appreciated, however, that the charge electrode may be formed intermediate the ends of the passage using processing techniques similar to those described above or may be formed in the entirety of the walls of the passage as previously described. The portion of a passage which is used as a charge electrode is determined by the processing technique used, as well as where droplets are formed relative to the structure.

FIG. 1, as previously explained, illustrates a charge electrode structure in which the charge electrode comprises the complete passage and droplets are formed in the interior of the structure.

Figure 7:
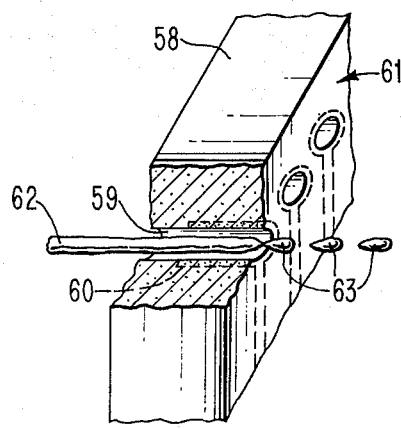
FIGS. 7 and 8 are fragmentary sectional views of charge electrode structures according to the present invention.

FIG. 7 illustrates a charge electrode structure formed in a substrate 58 by a process as described in relation to FIG. 6. A passage 59 extends therethrough, and a charge electrode 60 comprises a diffusion in a selected portion of the passage which extends a selected amount from the front surface 61 of the substrate 58. It is to be appreciated that the selected amount may be a finite distance which is extremely small. For example, a diffusion may be made only the front surface 61 adjacent the exit end of the passage 59, for forming a charge electrode. It follows, however, that the diffusion and accordingly the charge electrode extends a finite distance into the passage. A liquid stream 62 breaks up to form droplets 63 just as the stream exits from the structure.

Figure 8:
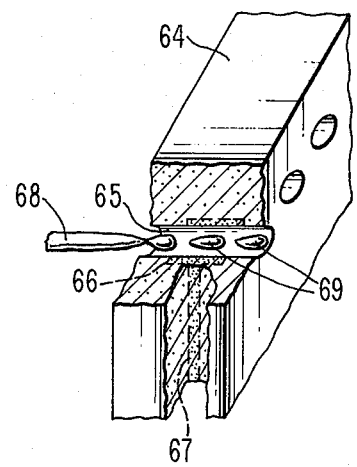

FIG. 8 illustrates a charge electrode structure formed in a silicon substrate 64 by a processing technique, not described, which in certain respects is similar to that described in relation to FIG. 6. A passage 65 extends therethrough, and a charge electrode 66 comprises a diffusion in a selected portion of the passage which is intermediate the ends thereof. Control connection to the electrode 66 may be by means of a diffusion formed in a hole 67 which contacts the electrode. The hole may be formed by etching, drilling or the like. A liquid stream 68 breaks up to form droplets 69 just before the stream enters the structure.

Figure 5:
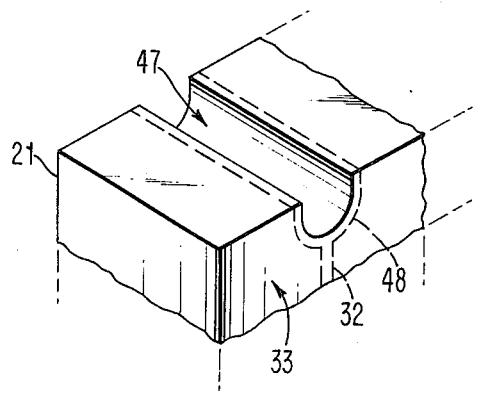
FIG. 5 is a fragmentary perspective view of a portion of a control head having a control electrode with a different shape.

For the charge electrode structures shown in FIGS. 6, 7 and 8, control circuits may be formed on the respective substrates in a manner similar to that set forth in relation to FIG. 4. Further, a slotted structure as shown in FIG. 5 may also be formed using a technique similar to that described in relation to FIG. 6.

An advantage of this invention is that it substantially reduces the number of wires to control head for the charging electrodes of a recording apparatus. Another advantage of this invention is that it eliminates the difficulty of forming charging electrodes.

In summary, an integrated ink jet printing head which includes a charge electrode structure has been disclosed, and which charge electrode structure comprises a semiconductor substrate having at least one passage extending therethrough. A diffused region is formed in the substrate in at least a selected portion of the one passage, with the diffused region being of the opposite type of conductivity to the type of conductivity of the substrate. The diffused region comprises a charge electrode. Control circuits are formed on the substrate for controlling the energization of the charge electrode.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A charge electrode structure comprising:
   a semiconductor substrate having at least one passage extending therethrough; and
   a diffused region formed in said substrate in at least a selected portion of said one passage, with said diffused region being of the opposite type of conductivity to the type of conductivity of said substrate, and wherein said diffused region comprises a charge electrode.

2. The combination claimed in claim 1, wherein said selected portion of said one passage extends a selected amount from one end thereof.

3. The combination claimed in claim 1, wherein said selected portion of said one passage comprises all of said one passage.

4. The combination claimed in claim 1, wherein said selected portion of said one passage is intermediate the ends thereof.

5. The combination claimed in claim 1, wherein said one passage comprises a slot.

6. The combination claimed in claim 5, wherein said slot is U-shaped.

7. The combination claimed in claim 1, wherein said one passage is circular in cross-section.

8. The combination claimed in claim 1, wherein said substrate comprises silicon.

9. The combination claimed in claim 1, including:
   control circuits formed on said substrate and connected to said charge electrode for controlling the energization of said charge electrode.

10. A charge electrode structure comprising:
    a semiconductor substrate having a plurality of passages extending therethrough; and
    a diffused region formed in said substrate in at least a selected portion of each of said passages, with said diffused region being of the opposite type conductivity to the type of conductivity of said substrate, and wherein the diffused region in each passage comprises a charge electrode.

11. The combination claimed in claim 10, including:
    control circuits formed on said substrate and connected to each of said charge electrodes for selectively controlling the energization of each charge electrode.

12. In a recording apparatus wherein droplets formed from at least one liquid stream are selectively applied to a recording medium, the combination comprising:
    a semiconductor substrate having at least one passage extending therethrough, with said one stream passing through said one passage;
    a charging electrode formed in at least a selected portion of said one passage, with said charging electrode comprising a diffused region in said substrate corresponding to the selected portion of said one passage, with said diffused region being of the opposite type of conductivity to the type of conductivity of said substrate, and;
    means to selectively control said charging electrode in accordance with whether or not a droplet is to be applied to said recording medium.

13. The combination claimed in claim 12, wherein the last named means comprises control circuit means formed in said semiconductor substrate.

14. In a recording apparatus wherein droplets formed from a plurality of liquid streams are selectively applied to a recording medium, the combination comprising:
   a semiconductor substrate having a plurality of passages extending therethrough, with each of said passages having one of said streams passing therethrough;
   a charging electrode formed in at least a selected portion of each of said passages, with each charging electrode comprising a diffused region in said substrate corresponding to the selected portion of the passage, with said diffused region being of the opposite type of conductivity to the type of conductivity of said substrate; and
   means to selectively control each charging electrode in accordance with whether or not a droplet is to be applied to said recording medium.

15. The combination claimed in claim 14, wherein the last named means comprises control circuit means formed in said semiconductor substrate.

16. In a recording apparatus having droplets formed from a plurality of streams selectively applied to a recording medium, the improvement including:
   a semiconductor substrate having a plurality of charging electrodes extending therethrough, each of said charging electrodes having one of the liquid streams pass therethrough with droplets being produced from the stream while in said charging electrode;
   each of said charging electrodes comprising a diffused region in said substrate of the opposite type of conductivity to the type of conductivity of said substrate;
   and means to selectively control each of said charging electrodes in accordance with whether the droplet within said charging electrode is to be applied or not be applied to the recording medium.

17. The improvement according to claim 16 in which each of said charging electrodes forms a passage completely surrounding the stream.

18. The improvement according to claim 16 in which each of said charging electrodes forms a passage partially surrounding the stream.

19. The improvement according to claim 16 in which said substrate is formed of silicon.

20. The improvement according to claim 16 in which said selectively control means includes:
   storage means in said substrate to store a signal for each of said charging electrodes;
   and means in said substrate responsive to the stored signals in said storage means to control which of said charging electrodes in said substrate is charged simultaneously.

21. The improvement according to claim 20 in which said storage means is a shift register;
   and a single wire supplies all stored signals to said shift register.

22. The improvement according to claim 21 in which said responsive means comprises separate latch means for each of said charging electrodes;
   and a single wire supplies signals to activate all of said latch means simultaneously.

23. The improvement according to claim 22 in which each of said charging electrodes forms a passage completely surrounding the stream.

24. The improvement according to claim 23 in which said substrate is formed of silicon.

25. The improvement according to claim 22 in which each of said charging electrodes forms a passage partially surrounding the stream.

26. The improvement according to claim 25 in which said substrate is formed of silicon.

* * * * *